(12) United States Patent
Yamamoto

(10) Patent No.: US 6,863,164 B2
(45) Date of Patent: Mar. 8, 2005

(54) END BEARING AND ONEWAY CLUTCH APPARATUS

(75) Inventor: Norihiro Yamamoto, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/440,199

(22) Filed: May 19, 2003

(65) Prior Publication Data

US 2004/0020738 A1 Feb. 5, 2004

(30) Foreign Application Priority Data

May 21, 2002 (JP) ........................................ 2002-146559

(51) Int. Cl.$^7$ ............................................. F16D 15/00
(52) U.S. Cl. ..................................................... 192/41 A
(58) Field of Search ............................. 192/41 A, 45.1; 188/82.8

(56) References Cited

U.S. PATENT DOCUMENTS

| | | | | |
|---|---|---|---|---|
| 4,736,827 A | * | 4/1988 | Kinoshita | ................. 192/41 A |
| 4,875,564 A | * | 10/1989 | Leitz et al. | ................. 192/45.1 |
| 4,911,273 A | * | 3/1990 | Kinoshita et al. | ......... 192/41 A |
| 6,138,803 A | * | 10/2000 | Muramatsu et al. | ...... 192/41 A |
| 6,161,668 A | * | 12/2000 | Le Calve et al. | ......... 192/41 A |
| 6,591,955 B2 | * | 7/2003 | Calve | ........................ 192/45.1 |

* cited by examiner

*Primary Examiner*—Saul Rodriguez
(74) *Attorney, Agent, or Firm*—Miles & Stockbridge P.C.

(57) ABSTRACT

An annular end bearing for a oneway clutch comprises a sliding-contact flange interposed between an inner ring and an outer ring of the oneway clutch and brought into sliding contact with the inner ring or the outer ring when it is operated, a fixed flange substantially fixed with respect to the inner ring or the outer ring, and a web for coupling the sliding-contact flange to the fixed flange. The end bearing is formed of a metallic plate by press forming and said web is provided with a bending part in the vicinity of said sliding-contact flange.

11 Claims, 5 Drawing Sheets

END BEARING AND ONEWAY CLUTCH APPARATUS

This application claims the benefit of Japanese Patent application No. 2002-146559 which is hereby incorporated by reference.

BACKGROUND OF THE INVENTION

1. Field of the Invention

The present invention relates to an end bearing of a oneway clutch apparatus for constituting an automatic transmission, or the like, for a motor vehicle and a oneway clutch apparatus employing this end bearing, and more specifically, to a technology for preventing problems such as seizure while enhancing the productivity and reducing the manufacturing cost.

2. Related Background Art

Generally, an automatic transmission for a motor vehicle is provided with a planetary gear transmission mechanism of three to five speed levels, apart from a torque inverter serving as a fluid joint, and changes the speed by appropriately fixing or releasing the constituent elements (a sun gear, a planetary gear, etc.) of the planetary gear transmission mechanism by means of a frictional engagement means such as a clutch or a brake. As the frictional engagement means to be incorporated in the automatic transmission, a wet type multiple disc clutch is employed in which a friction plate and a separator plate are alternately provided, except in some transmissions of a band brake type. A pressure oil from a transmission control hydraulic circuit is employed for pressure contact (frictional engagement) between the both plates. As these frictional engagement means, a member which attains easier transmission control by incorporating the oneway clutch apparatus therein and freely rotating a gear shaft, etc., in one of the directions of rotation is employed in some cases.

In the oneway clutch apparatus, in order to ensure an operation of the clutch constituent elements such as a sprag, an annular end bearing 39 for restricting the movement of the clutch constituent elements, as shown in FIG. 5 or FIG. 6, is often interposed between an inner ring 5 and an outer ring 7. Normally, the end bearing 39 is formed of copper alloy (phosphor bronze or the like) or bimetal (which is obtained by bonding a copper alloy and a steel plate together as a unitary structure). For example, an end bearing shown in FIG. 5 is formed of solid blank by cutting work and that shown in FIG. 6 is formed of a plate by press work.

Out of the end bearings 39 described above is, the one formed by cutting work is excellent in performance with high accuracy and high strength, though disadvantageously requiring high processing cost with low material yield and low mass productivity. On the other hand, the one formed by press work has no such drawback or problem of the former type end bearing. However, it is difficult to enhance the strength or rigidity of this end bearing since the thickness of a plate serving as the material thereof can not be increased freely. For this reason, in a oneway clutch apparatus of an inner ring driving type, for instance, as shown in FIG. 7, if an external force is applied on the sliding-contact flange 41, a wedge-like gap 61 is generated between the flange 41 and the inner ring 5 owing to elastic deformation, so that seizure or scoring may be caused by a rise of the surface pressure in a contact portion or by break of oil film in the gap 61.

SUMMARY OF THE INVENTION

The present invention has been contrived taking the above circumstances into consideration, and an object thereof is to provide an end bearing capable of preventing inconveniences such as seizure while enhancing the productivity and reducing the manufacturing cost, and a oneway clutch using this end bearing.

In order to solve the above problems, according to the present invention, there is proposed an annular end bearing comprising: a sliding-contact flange interposed between an inner ring and an outer ring of a oneway clutch apparatus and brought into sliding contact with the inner ring or the outer ring when it is operated; a fixed flange substantially fixed with respect to the inner ring or the outer ring; and a web for coupling the sliding-contact flange to the fixed flange, wherein the end bearing is formed of a metallic plate by press forming and the web is provided with a bending part in the vicinity of the sliding-contact flange.

According to the present invention, elastic deformation, etc., of the sliding-contact flange is suppressed by the bending part arranged in the vicinity thereof, so that a gap is hardly generated between the flange and the inner ring or the outer ring.

In the end bearing of the present invention, a reinforcing portion may be superposed on the sliding-contact flange in the bending part. If the reinforcing portion is superposed, the elastic deformation, etc., of the sliding-contact flange is further suppressed so that a gap is more hardly generated with the inner ring or the outer ring.

In the end bearing of the present invention, preferably the above-described web may be provided with a recess which may be formed on a surface corresponding to the outer side of the oneway clutch apparatus. According to the last mentioned preferable feature, the rigidity of the web is enhanced so that eccentricity or decentering between the sliding-contact flange and the fixed flange hardly occurs.

According to the present invention, seizure or the like between the end bearing and the inner ring or the outer ring hardly occurs, so that the durability of the apparatus is enhanced.

DETAILED DESCRIPTION OF THE PREFERRED EMBODIMENTS

Figure 1:
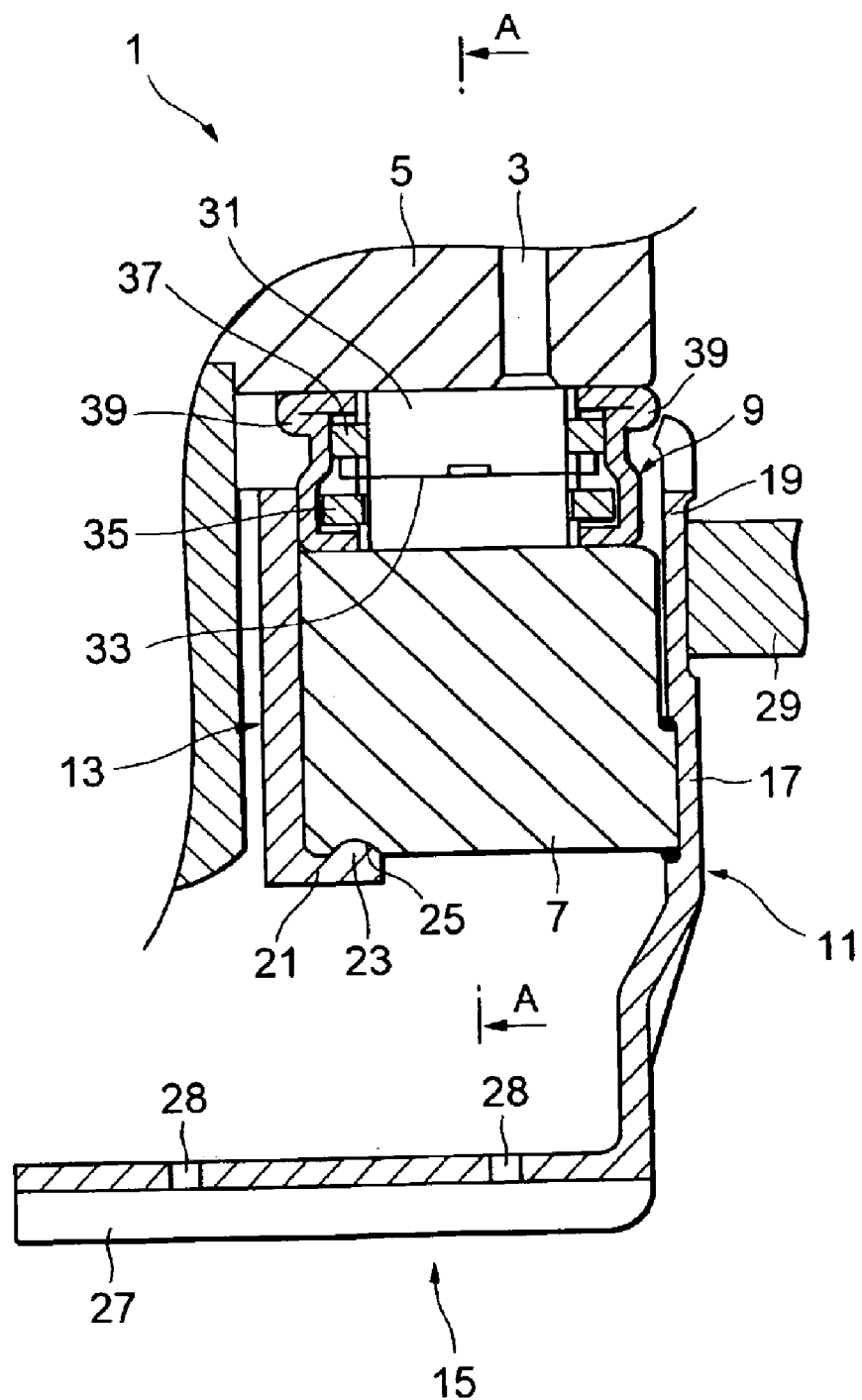
FIG. 1 is a longitudinally sectional view of the main portion of a oneway clutch apparatus according to the first embodiment of the present invention.
Figure 2:
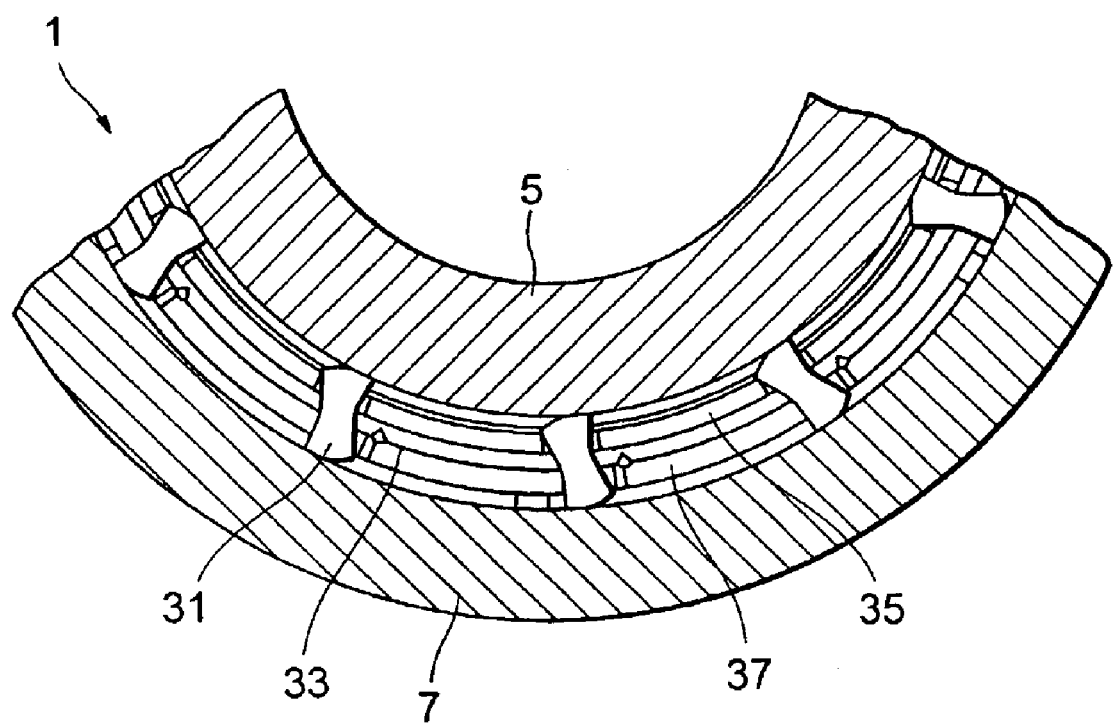
FIG. 2 is a sectional view taken along the line A—A in FIG. 1.

Preferred embodiments of a oneway clutch apparatus according to the present invention will be fully described in the following with reference to the drawings. FIG. 1 is a longitudinally sectional view of the main part of a oneway clutch apparatus according to a first embodiment, and FIG. 2 is a sectional view taken along the line A—A in FIG. 1. The oneway clutch apparatus of the present embodiment is incorporated in a wet type multiple disc clutch of an automatic transmission which, however, is not related to the gist of the present invention, so that description on the wet type multiple disc clutch will be omitted. In the description of the preferred embodiments, the right side in FIG. 1 denotes the front side, for convenience's sake.

As shown in FIGS. 1 and 2, the oneway clutch apparatus 1 comprises an inner ring 5 which is provided with a lubricating oil supply hole 3 open on the outer peripheral surface thereof, an outer ring 7 supported to be coaxial and freely rotatable with respect to this inner ring 5, a oneway clutch mechanism 9 of a sprag type interposed between the inner ring 5 and the outer ring 7, and front and rear retainers 11 and 13 which are secured to the both ends of the outer ring 7 for restricting an axial movement of the oneway clutch mechanism 9.

The oneway clutch apparatus 1 of the first embodiment is provided with the wet type multiple disc clutch formed outward in the circumferential direction of the outer ring 7, and the front retainer 11 is extended from a hub 15 which is formed of steel plate by press forming and constitutes the wet type multiple disc clutch. The front retainer 11 is composed of a mirror plate portion 17 which is welded to the front end surface of the outer ring 7, and a flange-like retainer portion 19 which is bent backward from the inner peripheral end of the mirror plate portion 17. On the other hand, the rear retainer 13 is formed of synthetic resin by injection molding, and a plurality of flange-like engagement portions 21 are formed on the front end surface of the rear retainer 13 to be fitted on the trailing end portion of the outer ring 7. On each of the engagement portions 21, there is formed an arcuate projection 23 at the edge end of the inner peripheral portion thereof, and this arcuate projection 23 is fitted in an annular groove 25 formed on the outer peripheral surface of the rear portion of the outer ring 7.

On the outer peripheral surface of the hub 15, there are formed splines 27 which are engaged with the friction plate of the wet type multiple disc clutch and lubricating oil supply holes 28 for communicating the inner peripheral surface with the outer peripheral surface of the hub 15. In FIG. 1, the member denoted by a reference numeral 29 is a Zytel washer which serves as a sliding bearing and is in sliding contact with the front end surface of the front retainer 11.

The oneway clutch mechanism 9 comprises a large number of sprags 31 serving as torque transmission elements, a ribbon spring 33 for holding the sprags 31 and, at the same time, urging them into the direction of engagement, an outer holder 35 for holding the ribbon spring 33 annularly, an inner holder 37 for restraining excessive inclination of the sprags 31 in cooperation with the outer holder 35, and a pair of front and rear end bearings 39 for maintaining a predetermined distance between the both holders 35 and 37 and, at the same time, suppressing eccentricity or decentering between the inner ring 5 and the outer ring 7, so as to ensure an operation of the sprags 31.

Figure 3:
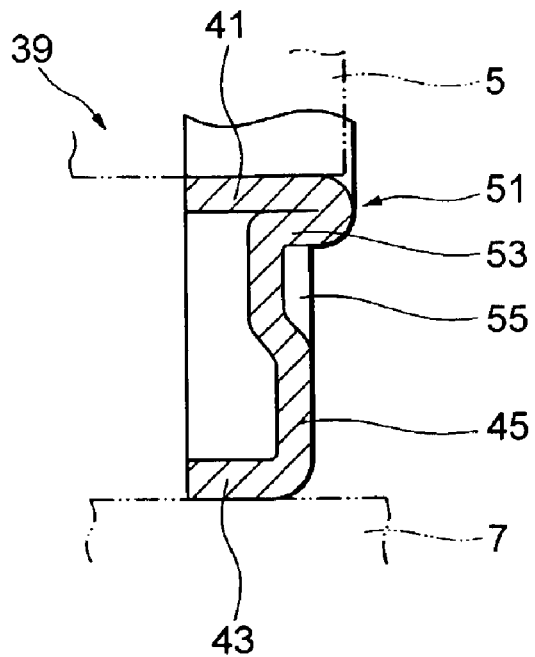
FIG. 3 is an enlarged sectional view of the main portion of the end bearing according to the first embodiment of the present invention.

The end bearing 39 is formed of phosphor bronze plate by press work and, as shown in the longitudinally sectional view of the main part in FIG. 3, has a cross section substantially in the form of U consisting of the sliding-contact flange 41 which is in sliding contact with the inner ring 5, the fixed flange 43 which is in contact with the outer ring 7, and the web 45 for coupling the sliding-contact flange 41 to the fixed flange 43.

Since having a comparatively large clearance with respect to the inner ring 5, the sliding-contact flange 41 is relatively rotated with respect to the inner ring 5 when the inner ring 5 and the outer ring 7 are rotated relatively with each other. On the other hand, since having a clearance of several ten microns with respect to the outer ring 7, fixed flange 43 is rotated together with the outer ring 7 owing to the viscosity or the like of the lubricating oil when the inner ring 5 and the outer ring 7 are rotated relatively with each other. However, the fixed flange 43 may be slid with respect to the outer ring 7 when the oneway clutch apparatus 1 is moved into a range of high speed rotation from a range of low speed rotation.

In case of the first embodiment, the web 45 of the end bearing 39 is provided with a bending part 51 in the vicinity of the sliding-contact flange 41, and a reinforcing portion 53 is formed to overlap the sliding-contact flange 41 in this bending part 51. The web 45 is also provided with a recess 55 on a surface corresponding to the outer side of the oneway clutch apparatus 1.

An operation of the first embodiment will be described below.

In the course of running of the car, a large number of drive transmitting elements are rotated inside the automatic transmission and, while the oneway clutch apparatus 1 is not operated, the inner ring 5 and the outer ring 7 are rotated relatively with each other. Then, since the end bearing 39 is rotated following the outer ring 7, the sliding-contact flange 41 thereof is brought into sliding contact with the outer peripheral surface of the outer ring 5.

In this case, the strength and the rigidity of the sliding-contact flange 41 of the present embodiment are, with the reinforcing portion 53 overlapping thereon and the hardening effected on the bending part 51, largely higher than those of the conventional apparatus. For this reason, if a stress in the radial direction for causing the decentering or eccentricity between the inner ring 5 and the outer ring 7 works, there occurs no elastic deformation of the sliding-contact flange 41 which may generate a gap with the inner ring 5, thereby preventing seizure or scoring which may be caused by a rise of the contact surface pressure or by break of oil film in the gap. In addition, since the recess 55 is formed on a side surface of the web 45, the rigidity of the web 45 is enhanced, whereby the eccentricity or decentering between the inner ring 5 and the outer ring 7 is difficult to occur.

Figure 4:
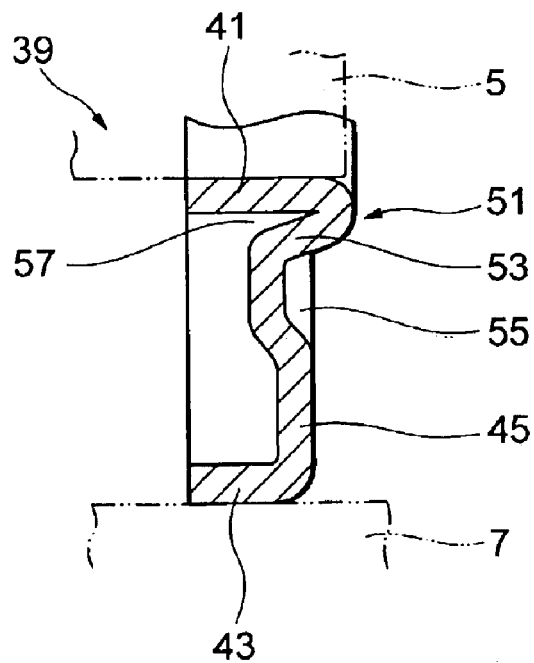
FIG. 4 is an enlarged sectional view of the main portion of an end bearing according to the second embodiment of the present invention.
Figure 5:
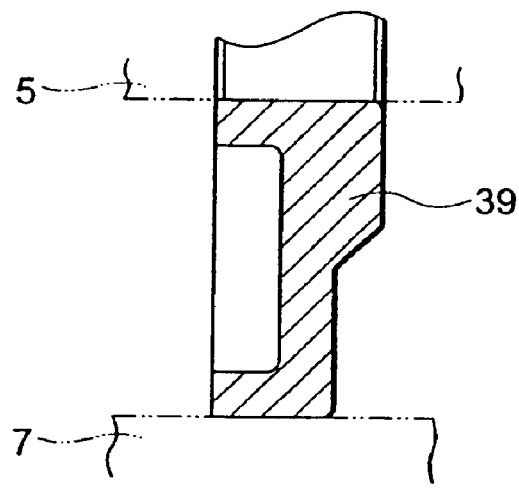
FIG. 5 is an enlarged sectional view of a conventional end bearing formed by cutting work, for showing the main portion thereof.
Figure 6:
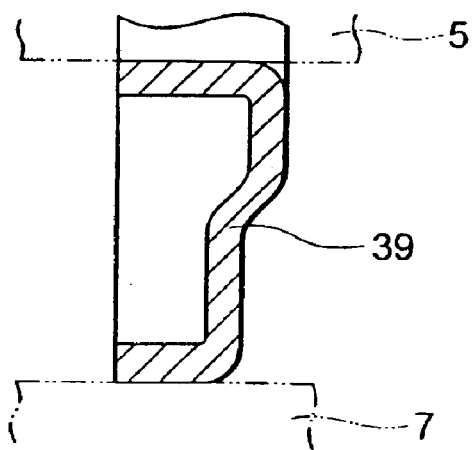
FIG. 6 is an enlarged sectional view of a conventional end bearing formed by press work, for showing the main portion thereof.
Figure 7:
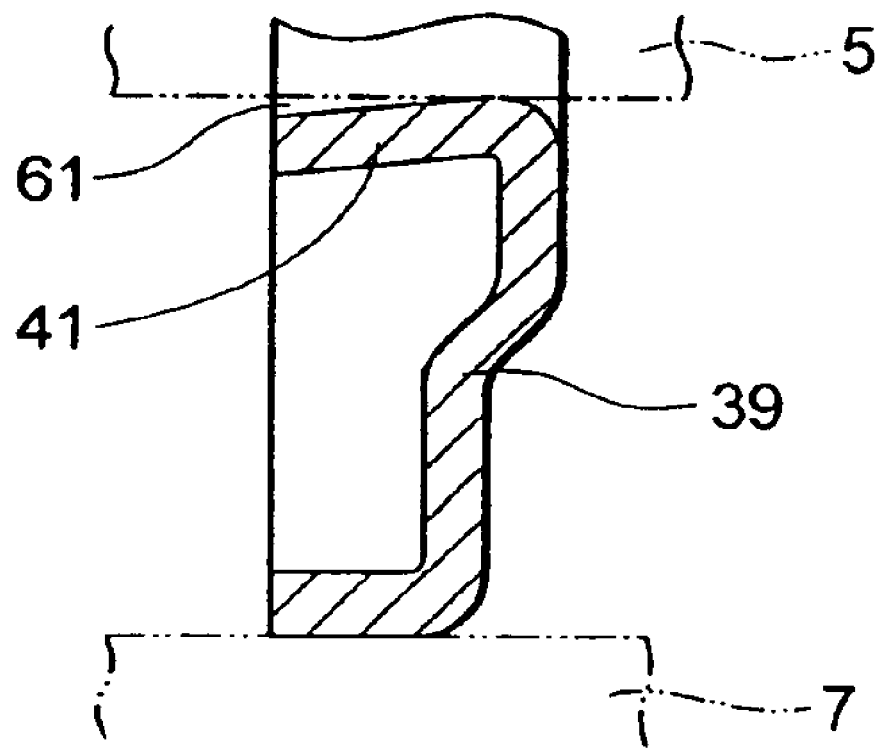
FIG. 7 is an enlarged sectional view of another conventional end bearing formed by press work, for showing the main portion thereof.

FIG. 4 shows a longitudinal cross section for showing the main part of an end bearing according to a second embodiment of the present invention. As shown in FIG. 4, the whole form of the end bearing 39 of the second embodiment is substantially the same as that of the first embodiment described above, except that the reinforcing portion 53 formed on the bending part 51 is not superposed on the sliding-contact flange 41. That is, between the reinforcing portion 53 and the sliding-contact flange 41, there is formed a wedge-like gap 57 so as to facilitate the press work. An operation of the second embodiment is substantially the same as that of the first embodiment. However, in the second embodiment, the end bearing 39 is manufactured more easily so that the manufacturing cost and the number of the manufacturing steps can be reduced.

The embodiments of the present invention are as specifically described above. However, the present invention is not limited to these embodiments, but may be applied to an end bearing of a oneway clutch apparatus of a type other than the sprag type, or an end bearing for a oneway clutch apparatus of an outer ring drive type. As a material of the end bearing, a copper alloy other than phosphor bronze, soft steel, stainless steel, or the like may be singly employed. Or, as a bimetal material, lead bronze, high lead bronze, babbitt metal, cadmium alloy, silver plating, or the like, may be employed for the bearing side, while copper, cast iron, bronze, or the like, may be employed for the back side. Soft steel may be coated with copper alloy or lead of various types. Other arrangements, or the like, of the oneway clutch apparatus such as a specific form of the end bearing may be properly altered within the scope and spirit of the present invention.

According to the present invention, the annular end bearing comprises the sliding-contact flange which is interposed between the inner ring and the outer ring of the oneway clutch apparatus and brought into sliding contact with the inner ring or the outer ring when it is operated, the fixed flange which is substantially fixed with respect to the inner ring or the outer ring, and a web for coupling the sliding-contact flange to the fixed flange, and the end bearing is formed of a metallic plate by press work and the web is provided with the bending part in the vicinity of the sliding-contact flange. Thus, the elastic deformation, or the like, of the sidling flange is suppressed by the bending part, a gap is hardly generated between the inner ring and the outer ring, and seizure or scoring due to a rise of the contact surface pressure or break of oil film in the gas can be prevented.

What is claim is:

1. An annular end bearing for a oneway clutch, integrally formed of a metallic plate by press forming, comprising:
   a sliding-contact cylindrical flange interposed between an inner ring and an outer ring of the oneway clutch apparatus and brought into sliding contact with said inner ring or said outer ring when it is operated;
   a second cylindrical flange substantially fixed with respect to said inner ring or said outer ring; and
   a web coupling said sliding-contact flange to said fixed flange,
   wherein a portion of the web continuous to said sliding-contact cylindrical flange is bent back inwardly along an axis of said sliding-contact cylindrical flange, thereby reinforcing said annular end bearing.

2. The end bearing according to claim 1, wherein said portion of the web has a surface superposed on and in contact with said sliding-contact cylindrical flange.

3. The end bearing according to claim 1, wherein on said web there is formed a recess on a surface corresponding to an outer side of the oneway clutch apparatus.

4. The end bearing according to claim 2, wherein on said web there is formed a recess on a surface corresponding to an outer side of the oneway clutch apparatus.

5. A oneway clutch comprising:
   an inner ring;
   an outer ring; and
   a torque transmitting member and an annular end bearing interposed between said inner ring and said outer ring,
   wherein said end bearing has first and second cylindrical flanges joined through a web, and
   wherein a portion of the web continuous to said first cylindrical flange is bent back inwardly along an axis of said first cylindrical flange, thereby reinforcing said annular end bearing.

6. The clutch according to claim 5, wherein said portion of the web has a surface superposed on and in contact with said first cylindrical flange.

7. The clutch according to claim 6, wherein on said web there is formed a recess on a surface corresponding to an outer side of the oneway clutch.

8. The clutch according to claim 5, wherein said first cylindrical flange slides relative to one of said inner ring and said outer ring during operation of the clutch.

9. The clutch according to claim 8, wherein said second cylindrical flange is substantially fixed relative to the other of said inner ring and said outer ring.

10. The clutch according to claim 8, wherein said portion of the web has a surface superposed on and in contact with said first cylindrical flange.

11. The clutch according to claim 10, wherein on said web there is formed a recess on a surface corresponding to an outer side of the oneway clutch.

* * * * *